United States Patent [19]

Rhoades et al.

[11] Patent Number: 4,908,574
[45] Date of Patent: * Mar. 13, 1990

[54] CAPACITOR ARRAY SENSORS FOR DETERMINING CONFORMITY TO SURFACE SHAPE

[75] Inventors: Lawrence J. Rhoades, Pittsburg; Donald Risko, Monroeville; Ralph L. Resnick, Slickville, all of Pa.

[73] Assignee: Extrude Hone Corporation, Irwin, Pa.

[*] Notice: The portion of the term of this patent subsequent to Aug. 23, 2005 has been disclaimed.

[21] Appl. No.: 225,820

[22] Filed: Jul. 29, 1988

Related U.S. Application Data

[63] Continuation-in-part of Ser. No. 903,178, Sep. 3, 1986, Pat. No. 4,766,389.

[51] Int. Cl.$^4$ ............................. G01B 728; G01B 7/34
[52] U.S. Cl. ................................. 324/675; 324/690; 901/33; 901/46; 361/283
[58] Field of Search ............... 324/61 R, 61 P, 61 QS, 324/61 QL; 361/278, 280, 283, 287, 290; 901/9, 10, 33, 34, 35, 44, 45, 46

[56] References Cited

U.S. PATENT DOCUMENTS

| | | | |
|---|---|---|---|
| 2,856,582 | 10/1958 | Anderson | 324/61 R |
| 3,651,505 | 3/1972 | Schmidt | 324/61 R |
| 4,103,226 | 7/1978 | Fromson et al. | 324/61 R |
| 4,352,060 | 9/1982 | Garpendahl et al. | 324/61 QS |
| 4,413,349 | 11/1983 | Bailey | 324/61 QS |
| 4,451,780 | 5/1984 | Ogasawara | 324/61 R |
| 4,557,386 | 12/1985 | Buckley et al. | 901/46 |
| 4,588,348 | 5/1986 | Beni et al. | 901/46 |
| 4,611,296 | 9/1986 | Niedermayr | 901/46 |

Primary Examiner—William M. Shoop, Jr.
Assistant Examiner—H. L. Williams
Attorney, Agent, or Firm—Waldron & Associates

[57] ABSTRACT

A sensor for sensing and quantifying the conformity of a workpiece surface contour to a predetermined design contour. The sensor consists of an array of capacitor elements on a surface having the negative image of the predetermined design contour, against which the workpiece is mated. In operation, each of the capacitor elements and the workpiece are connected to a corresponding oscillator circuit so that the frequency of each circuit is a function of the capacitance between the individual plate element and the workpiece, while the capacitance is a function of the distance between the individual plate element and the workpiece. Hence the overall output of the circuits is a function of the conformity of the workpiece surface contour to the contour or topology of the sensor surface.

12 Claims, 3 Drawing Sheets

CAPACITOR ARRAY SENSORS FOR DETERMINING CONFORMITY TO SURFACE SHAPE

This is a continuation-in-part application of patent application Ser. No. 06/903,178, filed Sept. 3, 1986 now U.S. Pat. No. 4,766,389.

This invention relates to capacitance based sensors for determining and quantifying the conformity of a workpiece surface contour to exacting design requirements. In the past there have been a number of uses of capacitance based sensors, typified by the use of metal plated onto Mylar film employed as one plate of a capacitor for the evaluation add quantification of surface roughness and the like of machined metal surfaces and the like. See for example, U.S. Pat. No. 4,422,035 issued to Risko and U.S. Pat. No. 4,182,981 issued to Shum.

Such sensors have established a highly useful role in industrial manufacturing ad in the machine tool industry, in particular, for the characterization of surface properties. As the art is now aware, these sensors are based on the employment of a variable capacitance, due to the coupling of the sensor with a surface to be evaluated, by techniques such as controlling the rate of an oscillator circuit, so that the frequency of the oscillator is directly determined and altered as a function of surface roughness.

The need for improved sensing of surface characteristics continues as machining requirements become more complex and demanding. While the above mentioned Risko Patent has provided a greatly improved method and apparatus for sensing surface roughness, it does not provide any measurement of surface contour. Surface contour of engine components which are not defined by straight lines or radiused arcs, such a turbine blades for example, for the most part, are still hand measured with templates, where the face of a particular component workpiece is fitted against one or more templates having the negative form of the desired configuration, and then visually determining how well the component workpiece face conforms to that defined by the templates. A machinist attempting to grind a turbine blade, for example, to a predetermined form of surface on tour, must match the turbine blade to one or more templates to visually see how well the turbine blade matches the desired contour as defined by the templates. In some situations, such as those where the contour of the turbine blade progressively changes pitch, he may need to utilize a series of templates which define the desired contour at various sections along the length of the turbine blade. In certain other applications he may use a larger one-piece template which mates against the entire face to be checked. In this situation the gap between the turbine blade and template cannot be seen to determine conformity of the turbine blade surface to that of the template. Therefore, the template surface is covered with chalk so that any high spots on the turbine blade surface will contact the template to the exclusion of other surface areas. Then, after mating the turbine blade to the chalk-covered template, chalk on certain limited areas of the turbine blade surface will reveal those high areas which need to be ground down. After some grinding on those chalk covered areas, the process must be repeated, typically several times and the turbine blade reground several times until the template uniformly transfers chalk onto the entire surface of the turbine blade, which indicates that the turbine blade and template mated to each other over the entire surface area, and that the turbine blade, therefore, has the surface configuration as desired. It should be obvious that this procedure is not only time consuming and costly, but the accuracy of the grinding operation is based on the operator's visual observation, and is therefore not as accurately exacting as is desired for some of the more demanding requirements as are becoming commonplace.

While the prior art has seen some developments of automated surface contour determination, none o them would function to determine the conformity of an irregular surface contour to a predetermined requirement. U.S. Pat. No. 4,413,349 issued to Bailey, for example, utilizes a sensor, such as a capacitor, secured to the end of a pivotal arm which can be pivoted to define a spherical segment. The non-contacting sensor can then be moved through a three-dimensional arc to measure the distance to the workpiece, which is in the form of a concave spherical segment, to thereby determine the conformity of the workpiece to a predefined spherical segment form. This apparatus, however, requires the movement of the sensor to determine the conformity of each selected point on the workpiece and will not determine the conformity of the workpiece as a whole, and cannot be utilized to measure workpieces other than spherical segments or hemispheres. Other patents of interest include U.S. Pat. Nos. 3,651,505, Schmidt; 4,526,043, Boie et al.; 4,557,386 Buckley et al.; 4.584,625, Kellogg; 4,588,348, Beni et al.; 4,611,296, Niedermayr and E. German Pat. No. 2,268 27A. While all of these patents are addressed to some form of capacitor sensor as may be utilized in industrial applications for sensing one or more characteristics of objects, none of them in any way address the sensing of conformity to surface contour requirements.

SUMMARY OF THE INVENTION

This invention is predicated on the use of a plurality of capacitor elements in a predetermined array of known topology, and are configured for both collective and separate sensing of capacitance properties, permitting both contact and non-contact based measurements, which measures and quantifies conformity to quality control for shape and contour, and can include measurements for dimensions, surface finish and the like. The capacitor array based detectors and sensors of this invention operate in a highly sensitive and high speed manner suitable for real time control via analog or digital electronic control techniques. Digital systems, based on closed loop feedback control techniques are preferred, particularly with discrete multiplexing of capacitance measurement from each capacitor element in the array. Serial polling may also be employed, although the sampling rates required for some uses of the system will limit the desirability of such techniques.

In the present invention, the features and functions are attained by forming a three-dimensional array of a plurality of discrete capacitr plate elements or pin elements on a surface which has a shape and contour that is the negative of the design shape and contour as intended for a workpiece or part to measured. Each individual capacitor element will conform generally to the structure of the sensors of the prior patents to Risko and Shum, noted above. In providing a plurality of such capacitor elements, there are requirements for providing separate leads for each, and when the elements are formed, as for example, from metal plated Mylar film, the multiple plate elements and the associated leads therefor can be readily made by the same techniques described in the prior patents for the formation of individual plate elements. For other embodiments, a plurality of parallel pins may be used as the capacitor elements with the extension of the pins serving as the leads. The layout is not critical, but it is preferred that it be a regular repeated pattern, preferably formed with a high degree of precision in the contoured X-Y plane, since the accuracy of the measurements to be taken will depend on the accuracy of the pattern. One particularly ideal layout for the array is to utilize a hexagonal pattern of close spaced hexagonal plate elements. Other high coverage arrangements may be suitably effective, such as close packed pin elements, which may be shrouded to minimize stray capacitance, or even a combination of arrangements.

Resolution of the measurements to be taken with the system based on evaluation of the capacitance values for each element or cell in the array will be dependent on the size of the elements, while other evaluations could be based on comparative values taken from plurality elements, and the resolution will be dependent on the closeness of the elements to each other as well as the discrete size of each.

In this context, then, it is self evident that the number of elements, their size, and the closeness of their packing should be consist with the values to be determined and the resolution required, as will be developed in more detail hereinafter. As a general parameter, the number, size, packing density, and total surface area of the elements of the array should be as great as the capacity of the control system employed will accept at speeds consistent within real time feedback rate requirements.

The determination of contour conformity is effected by first mating the part or workpiece against the contoured array of elements while each is connected to the oscillator circuit. Conformity of the contour topology is then developed by polling of the discrete elements of the array at a capacitive coupling pattern which, either via proximity determination or contact characteristics or some combination of both, will provide a "contour" characteristic of the contour of the workpiece or part.

The operation of the present invention is based on the primary relationship:

$$C = K \times A / t$$

where C is capacitance, K is the effective dielectric constant (a composite value in the present context), A is the area of the coupling surfaces, and t is the distance between capacitor plates, i.e. between the workpiece and the capacitor elements in the sensor in the present context.

In the context of the present invention, K and A are effectively fixed values, so that C is seen to be inversely proportional to t. It is also seen apparent that as t grows smaller and smaller, the magnitude of the change on C grows larger and larger, so that at very close spacings, even very small changes in spacing produce quite substantial signals for control purposes.

The triangulation of the varying data among the plural cells of the array is computationally simple, since the extent of coverage of each cell is the variable, while K and t are fixed values, and for each cell, C is directly proportional to A, as given in the above formula, although it may be necessary to correct for capacitance edge effects. With a known topology of the elements or cells of the array, and the measured portion of each cell which is in contact with the part, the calculation of conformity to contour topology is relatively simple. In the case of a simple direct contact sensor, if the part or workpiece has a contour topology as desired, it should be in equal contact with all capacitor plate elements. If the part or workpiece contour topology is not as desired, it will not contact all the capacitor plate elements, but contact only some of them while being spaced away from the others. The oscillation frequency will be a function of the distance between each capacitor plate element and the workpiece so that the non-conformance of the contour topology can easily be mapped and quantified. While this description is based on the utilization of the sensor as a "contact" sensor, where the sensor contacts the workpiece to measure contour conformity, it should be realized that the sensor can be utilized as a "spaced" sensor where it is brought into a close but spaced relationship to the workpiece providing a narrow air gap therebetween. The principal is of course the same in that high spots will effect a narrower gap than required and so on, with a conforming workpiece effecting a uniform gap.

In a third application of the invention, the sensor need not conform exactly to the contour or topology of the desired workpiece. Such a non-conforming sensor is utilized to measure and map the topology of standard reference test piece so that the capacitance values for the standard reference are known when using that sensor. Subsequently, tee same sensor can be utilized to map the topology of a workpiece and its conformity to the desired topology can be tested by contrasting the capacitance values obtained against those of the standard reference.

DETAILED DESCRIPTION OF THE INVENTION

Figure 1:
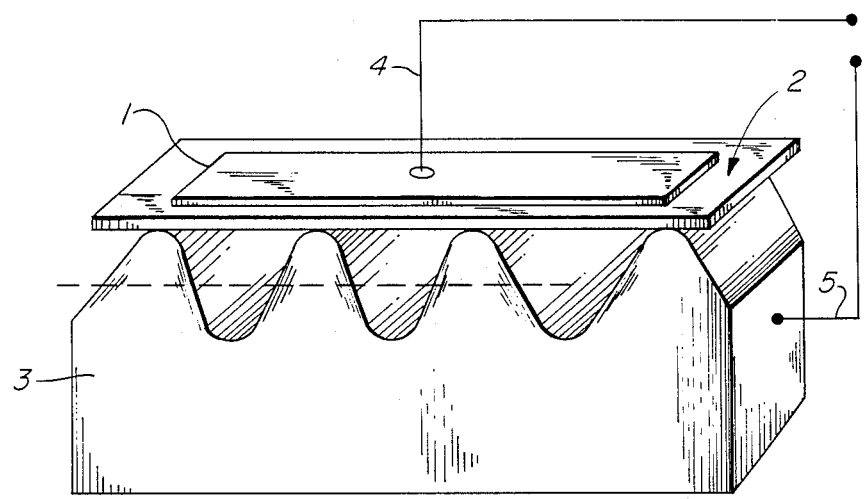
FIG. 1 is a magnified, isometric cut-away view of a of an individual sensor element according to one embodiment of this invention.

Reference to FIG. 1 will illustrate one embodiment of the individual sensor element of this invention, wherein the element, i.e. a sensor capacitor plate 1 is carried on a dielectric 2, which is utilized in this embodiment to prevent shorting of the capacitor plate 1 to the part or workpiece 3. The capacitor plate 1 has an electrical lead 4, which together with lead 5, in contact with the workpiece 3, constitute the input capacitance leads to the oscillator and counter circuitry.

Figure 2:
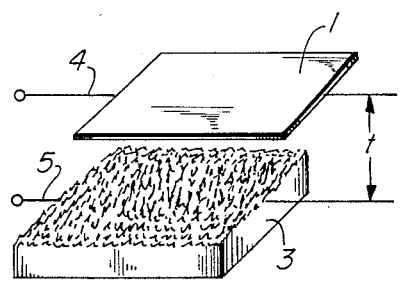
FIG. 2 shows an electrical element of the sensor of the embodiment shown in FIG. 1 and its function in the present invention shown in stylized form.

The electrical circuit elements of the sensor and their function in the present invention are shown in stylized form in FIG. 2.

Referring again to FIG. 1, the active capacitor plate element 1 and its dielectric 2 are preferably formed from an electrical conductor, such as aluminum or the like plated on the surface of a synthetic polymer film, such as polyethylene terephthalate film, a cross linked polyethylene iminse, or the like. The aluminum can be etched from the surface of the film in known fashion to provide a capacitor plate element of the desire size and shape. The electrical contact from the sensor plate 1 to the oscillator component is furnished by an electrical lead 4 which may be an integrally formed component of the etched surface, or may be an electrical lead bonded to the surface of the capacitor plate element 1 with a conductive adhesive, such as silver filled epoxy resin based adhesives and the like. Solder connections may also be employed if care is taken to protect the components of the system from the heat required.

In the context of the present invention, the electrical lead 4 must be made of a conductive material, and may be rigid, semi-rigid or even a conductive elastomeric material, such as a silicone elastomer with a conductive filler. It is far easier to arrange the multiple contacts required for the sensors in such a case than by efforts to employ the conductive layer on the Mylar film. In an alternate arrangement, the electrical leads may be formed of conductive fibers, such as X-Static silver plated nylon fiber monofilament available from Sauquout Corp., in Scranton, Pa. In the case of pin elements, lead 4 may merely be an extension of the pin itself.

The capacitor plate element 1 is preferably provided with a rigid backing 9 which serves to hold and maintain the surface of the sensor in its fixed predetermined topology so that contact with the surface of the workpiece will not distort the sensor topology.

Figure 3:
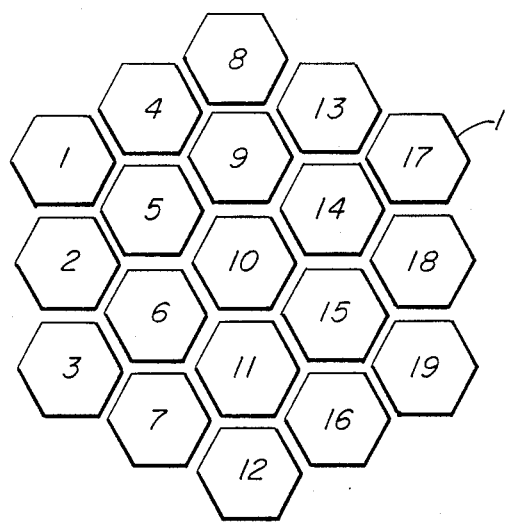
FIG. 3 illustrates a plan view of capacitor elements in a hexagonal array.

The capacitor elements as shown in FIGS. 1 and 2 are, as has been noted, components in an array. One arrangement of the array is a hexagonal pattern of hexagonal elements, as shown in FIG. 3. In FIG. 3, a specific array is shown, of a multiplicity of plate elements 1, on a common dielectric film of Mylar or the like. While in FIG. 3, 19 capacitor plate elements 1 are shown, other numbers of component plate element can be employed, in other configurations, to suit particular applications. Another arrangement of the array may consist of an alignment of rows of capacitor elements, such as shrouded pin elements 21 as shown if FIG. 5. While shrouding is not essential, it is preferable in this embodiment in that the shrouds serve to shield the elongated capacitor pin element from stray capacitance through the sides of the pin elements. While the pins are shown to be cylindrical in FIG. 5, other cross-sections may be used.

As a general rule, the higher the number of elements in a given sensor area, tee greater the resolution which can be achieved. As those of ordinary skill in the art will recognize, greater numbers of elements will require higher manufacturing costs, greater computational burdens on the system, and greater complexity and control difficulties. It is accordingly preferred to limit the number of elements to the minimum necessary to achieve the require degree of resolution for a given application. In addition, the capacitance values are a function of plate area, and as the dimensions of individual elements is decreased, and their number increased, there is a limit where the noise of the system from edge effects and ambient noise can become a barrier to increasing resolution. The limits on the dimensions will vary, but as a general rule, elements having an area of less than about 0.01 square millimeters are likely to prove to have signal to noise ratios which approach the limits of current and practical circuit design and real time computational burdens. In cases of compelling need, where the extra demands on the circuits and computing loads can be justified, it is possible to achieve meaningful results at a level which is about one order of magnitude smaller, but the general usage of the system of the present invention will often be satisfied without resort to the small elements which are possible, and sizes on the order of 0.1 to 2.0 square millimeters will be effective in the majority of applications. While there may be contexts where even coarser resolutions may be sufficient, and while there is no functional upper limit on the size of the plate elements, it will generally not be of any practical interest to make such arrays with elements having more than about 100 square millimeters. Even in applications which do not require the resolution of such arrays, it will rarely be worthwhile to make arrays with any larger plates.

Figure 4:
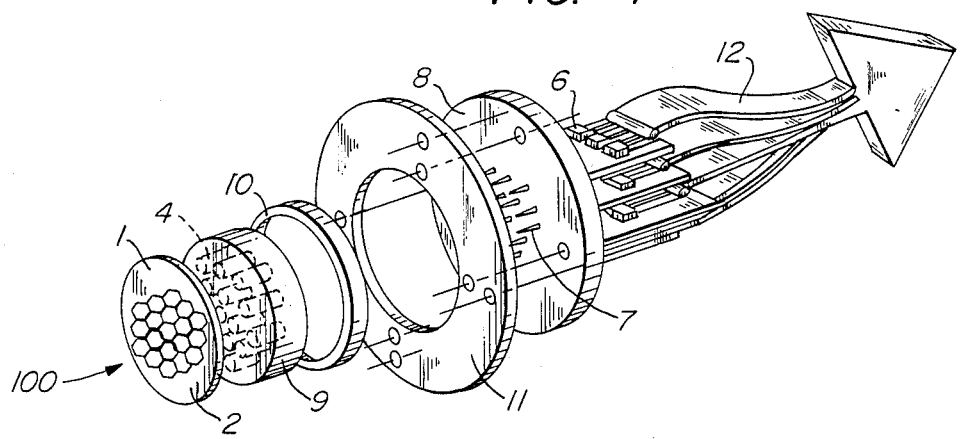
FIG. 4 is an exploded isometric view of a specific embodiment of this invention as may be utilized to measure the contour conformity of a turbine blade as shown.

For the array configuration shown in FIG. 3, the structure of a preferred specific embodiment representing the best mode of the sensor to date is shown in exploded form in FIG. 4. The reference numerals correspond to those of the preceding figures, where 1 represents the capacitor plate elements, collected into a multiple element array 100, 2 is the dielectric, 4 represents the multiple electrical leads from each capacitor plate 1 to its associated oscillator 6. As seen in FIG. 3, there will normally be one oscillator for each capacitor plate element 1, although multiplexing of several capacitor elements to one oscillator may be desired in some applications. Although not all the plural leads 4 and not all the oscillators 6 can be shown in the figure without loss of clarity, it is readily apparent that the structure will benefit considerably from the microminiaturization of these components. The plural oscillators are preferably incorporated into a single integrated circuit chip with multiple lead inputs and outputs. These matters are discussed in greater detail infra.

The electrical leads 4, which are present in a number equal to the number of capacitor plate elements 1 in the array, are, as previously noted, formed of a conductive material, bonded to the face of the capacitor plate elements with a conductive bond, such as a silver filled epoxy resin adhesive. Many such adhesives are commercially available in the art. The connection between the leads 4 and the oscillator 6 is conveniently made by contact pins 7, which may themselves be adhesively bonded to the leads 4. The contact pins 7 are carried on and penetrate through the mounting plate 8, formed of a suitable non-conductive material, e.g. nylon, polyimide, or other like polymer materials. The mounting plate 8 serves as a mount for the oscillator 6, and associated circuit elements, including output leads 12, and may, if desired, be a printed circuit board designed for the purpose required in the context of the present invention. The capacitor element array 100, with plural capacitor plate elements 1, and the dielectric 2 are provided with a rigid backing 9 which performs the functions already discussed supra, and which also serves to pot the electrical leads 4, insulate them from one another, and to furnish physical support for the array of leads. The length of the leads 4, and the thickness of the potting layer 9, should be the minimum necessary to connect the sensor plates 1 to the oscillator contacts 7, and to provide the backing necessary to maintain the contact of the array with the surface of a workpiece at a uniform even contact pressure. The assembly is completed by mounting ring 10, which functions to confine the sensor array in place, dimensioned so that the dielectric layer 2, and the capacitor elements 1 stand proud of the surface by a small amount, and upon contact with a workpiece are not compressed, at least at conventional contact pressures. The entire assembly is held in place in an aperture in the surface its environment of use by retainer ring 11.

Output leads 12 pass the signal from each of the oscillators 6 to the signal processing circuitry at an external location, not shown.

FIG. 4 shows a schematic version of the circuitry of the sensors, including the various elements of the array which are electrically active. The reference numbers correspond to those employed in FIGS. 1–3 for corresponding elements.

Figure 5:
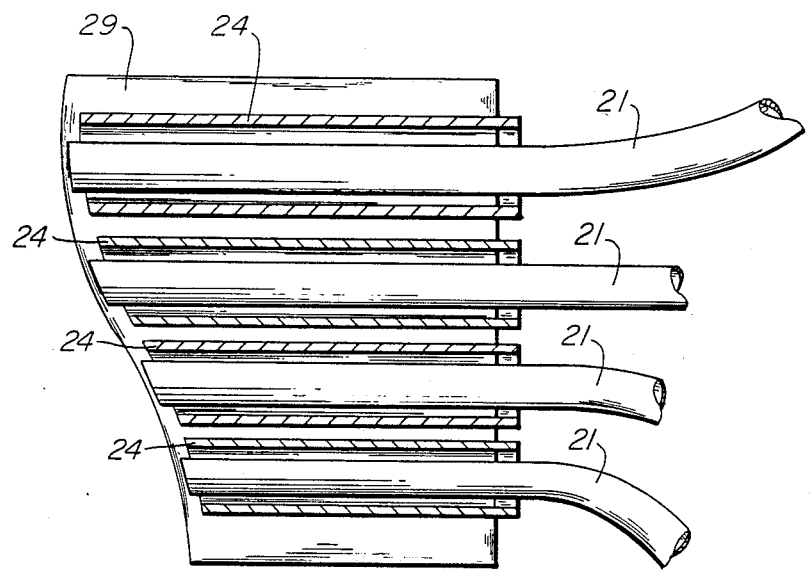
FIG. 5 illustrates a sectional side view of a three-dimensional sensor wherein the capacitor elements are elongated shielded pins.

FIG. 5 illustrates another sensor arrangement utilizing capacitor pin elements 21 wherein elongated pin elements 21 are aligned in a parallel pattern with one end of each length maintained within an insulative, rigid potted material 29 such that potting material 29 covers the lower ends of elements 21 with a uniform insulative layer. In this embodiment therefore, the potting material 29 serves not only to maintain the pin elements 21, but further series to insulate the end surfaces from contact with the workpiece. As illustrated, the pin elements 21 are each shielded with a cylindrical shroud 24, which, although not essential, does minimize the undesired effect of stray capacitance. The other ends of pin element wires are allowed to extend beyond the potting material 29 and thus serve as the essential leads as previously described.

It should be obvious that an insulative layer of some sort is essential in direct contact sensor application to prevent a short circuit when the sensor contacts the workpiece. Such an insulative layer is not essential a spaced sensor application here the sensor cannot come into contact with the workpiece. While such an insulative layer may, nevertheless, be preferred to protect the capacitor element surfaces from oxidation or damage, such a layer will diminish the sensitivity of the elements somewhat.

While the present invention is directed to the sensor, and its use in the generation of the outputs described herein, the signal processing is of course an important element in the use thereof. The output of each oscillator in the system is the functional equivalent of a single capacitor sensor, and may be used singly, as disclosed and discussed by Shum and Risko, disclosed and discussed above. It will generally prove sufficient to reduce the data manipulation burden to digitizing the oscillator signals and then mapping the departure of contour topology of the part or workpiece from the desired contour topology. The mapped contour topology will readily reveal the high and low spot areas, and quantify the degree of nonconformity by the magnitude of the oscillator signals from the capacitor plate elements not in contact with the workpiece.

The capacitor element array and dielectric must be formed into a negative contour topology corresponding to the desired surface of the workpiece. The potting composition is employed to preserve the shape, and the length of the leads may require adjustment. It is desirable that the potting formulation be rather rigid, i.e. not compressible at conventional contact pressures, since it is conformity to the desired contour which is to be determined, and with relatively rigid backing, no allowance or compensation for deformation of the backing is necessary and epoxy resin formulations are examples of preferred backing materials for these types of sensors. The variance in capacitance among the various elements of the array, when edge effects are compensated, will then be a direct measure of conformity to the required contour parameters for the object being evaluated. A specific set of tolerances may be developed, either as lookup tables or by a specific algorithm for manipulating the values detected, which can furnish yes or no decisions concerning the acceptability of the object or workpiece, and additionally, in many operations, to quantify the out of tolerance surface areas to serve as a control for corrective operations, or to map or measure the contour.

As described above, the sensor of this invention is utilized as the standard against which the workpiece contour is measured. In such an application, therefore, the sensor detail should be produced with a high degree of precision and accuracy, as the accuracy of the measurements taken will be no better than the accuracy of the sensor detail. As an alternative approach, the sensor can be utilized to measure the contour and topology of a reference standard part or component, and then the workpiece tested with that sensor is compared against the reference "standard". While this procedure would appear to add steps to the total operation, the additional effort would not be significant particularly in commercial operations where many identical parts are being produced, tested and measured against one reference standard. On the other hand, this procedure provides the advantage that the sensor need not be produced with a high degree of precision and accuracy. This should be obvious because inaccuracies in sensor detail will have an equal effect when measuring the reference standard or the workpiece. In this application it is preferable that the given sensor be utilized as a "spaced" sensor, and then the reference standard measured at two known and precisely controlled but different stand-off distances, one being the same at which the workpiece is measured, while the other is utilized to calibrate the effect of a known nonconformity on the capacitance reading when the workpiece is tested and measured with the same sensor, its measurements are compared against those of the reference standard. Where the readings are identical, or within tolerances, there is conformity. Where the readings are outside the tolerance limits, there is nonconformity. The values obtained from the nonconforming measurement of the reference standard can then be utilized to quantify the degree of nonconformity of the workpiece. As an alternative, two different but known standards can be measured as the control, one being the reference standard and the other having a known deviation therefrom for purposes of calibrating the effect of a known deviation on the capacitance reading.

If a robotic system is employed along with tools for controlled working of the workpiece, it will be possible to bring each workpiece or many workpieces within tolerances by such techniques, employing the data obtained from the sensor array to guide such corrective work, such as grinding, polishing and the like.

As those of ordinary skill in the art will have already recognized, the sensor array operations function as smart feeler gages, and offer to the art rather precise capabilities to improve quality control of part evaluation, correction and subsequent use in fashion which offers considerable improvement. Such operations have been largely done in the past by manual operations, requiring highly skilled and expensive labor in relatively large amounts. Hand operations do not offer the level of precision of reliability attainable in the present technique, and are generally slow. The present invention offers relief to the art from the generally slow and unpopular requirements of such operations, with substantial opportunity for improved results and reduced boredom in the work shop.

The foregoing is illustrative and the specification and drawings are not intended to be limiting on the scope of the present invention. They are intended to guide those of ordinary skill in the art in the practice of the invention, and should not be construed as definitive of the meets and bounds of the invention. The limits of the invention are defined by the following claims.

What is claimed is:

1. A capacitance sensor array for sensing and quantifying conformity of a workpiece surface contour to design requirements comprising a plurality of capacitor elements formed in a three-dimensional array of contour topology conforming to the topology of the design requirements of said workpiece, means for actively connecting each of said capacitor elements and said workpiece to one of a plurality of corresponding oscillator circuits while said capacitor elements are closely spaced from said workpiece so that the oscillation frequency of each of said circuits is a function of the capacitance between each said capacitor element and said workpiece, and means for generating an output from said sensor which is a function of the conformity of the contour topology of said workpiece to the contour topology of said array of capacitor elements determined by response of the said plurality of oscillator circuits.

2. The sensor of claim 1 wherein said capacitance between each of said capacitor elements and said workpiece is a function of the distance between the element and said workpiece.

3. The sensor of claim 1 wherein each of said capacitor elements has a frontal area of from 0.01 to 100 square millimeters.

4. The sensor of claim 1 wherein each of said capacitor elements has an area of from 0.1 to 10 square millimeters.

5. The sensor of claim 1 wherein said output is a plurality of signals corresponding to the oscillation frequency of each of said oscillators.

6. The sensor of claim 1 further having a signal processing means to process the signals from said plurality of oscillator circuits.

7. The sensor of claim 6 wherein said signal processing means evaluates the capacitance signals to detect and record conformity of the workpiece contour to the design contour.

8. The sensor of claim 6 wherein said signal processing means is employed to generate control signals for a tool which is operatively associated with said workpiece to work the surface of said workpiece to bring it into conformity with the design contour.

9. The sensor of claim 1 wherein said capacitor elements are plate elements.

10. The sensor of claim 1 wherein said capacitor elements are pin elements.

11. The sensor of claim 1 wherein said array is a hexagonal array of hexagonal capacitor plate elements.

12. A capacitance sensor array for sensing and quantifying conformity of a workpiece surface contour to design requirements comprising a plurality of capacitor elements formed in a three-dimensional array of contour topology conforming to the topology of the design requirements of said workpiece, a plurality of oscillator circuits in an amount such that there are more capacitors than oscillator circuits, means for actively connecting in multiplexed fashion a number of said capacitor elements and said workpiece to each of said oscillator circuits while said capacitor elements are closely spaced from said workpiece so that the oscillation frequency of each of said circuits is a function of the capacitance between each said capacitor element and said workpiece, and means for generating an output from said sensor which is a function of the conformity of the contour topology of said workpiece to the contour topology of said array of capacitor elements determined by response of the said plurality of oscillator circuits.

* * * * *